US012762493B2

(12) United States Patent
Guleria et al.

(10) Patent No.: US 12,762,493 B2
(45) Date of Patent: Oct. 13, 2026

(54) AUTOMATED DISCOVERY OF MIGRATION NOTES

(71) Applicant: SAP SE, Walldorf (DE)

(72) Inventors: Harshit Guleria, Gurgaon (IN); Praveen Kumar P, Bangalore (IN); Prasanna Jain, Gurgaon (IN); Jaroslav Jaros, Brno (CZ); Nibedita Dutta, Gurgaon (IN); Sudhir Verma, Gurgaon (IN)

(73) Assignee: SAP SE, Walldorf (DE)

(*) Notice: Subject to any disclaimer, the term of this patent is extended or adjusted under 35 U.S.C. 154(b) by 65 days.

(21) Appl. No.: 18/509,890

(22) Filed: Nov. 15, 2023

(65) Prior Publication Data

US 2025/0156787 A1 May 15, 2025

(51) Int. Cl.
*G06Q 10/0635* (2023.01)

(52) U.S. Cl.
CPC .................................. *G06Q 10/0635* (2013.01)

(58) Field of Classification Search
CPC .................................................. G06Q 10/0635
USPC ........................................................ 705/7.28
See application file for complete search history.

(56) References Cited

U.S. PATENT DOCUMENTS 12,417,506 B2* 9/2025 Subrahmanian ..... G06Q 50/184
2014/0143263 A1* 5/2014 Ritter .................... G06F 16/215
707/756
2016/0164918 A1* 6/2016 Satish ................. H04L 63/0236
2020/0349199 A1* 11/2020 Jayaraman .............. G06F 40/49
2021/0097062 A1* 4/2021 Mishra ................... G06N 20/00
2022/0188279 A1* 6/2022 Krishnaraju .......... G06F 16/258
2022/0383256 A1* 12/2022 Roh ....................... G06Q 50/40
2024/0152606 A1* 5/2024 Ron ...................... G06F 21/554

FOREIGN PATENT DOCUMENTS

WO WO-2023154543 A1 * 8/2023 ............ G06Q 10/10

OTHER PUBLICATIONS

Gensim, models.doc2vec—Doc2vecparagraph embeddings, printed Nov. 9, 2023, from https://radimreburek.com/gensim/models/doc2vec.html, 38 pages.

(Continued)

*Primary Examiner* — Abdallah A El-Hage Hassan
(74) *Attorney, Agent, or Firm* — Sterne, Kessler, Goldstein & Fox P.L.L.C.

(57) ABSTRACT

Disclosed herein are system, method, and computer program product embodiments for outputting a migration note. An embodiment operates by receiving a note, wherein the note is a solution for an incident. The embodiment then extracts incident data associated with the received note, wherein the incident data comprises a description of the incident. The embodiment then calculates, based on the description of the incident, a degree of proximity between the extracted incident data and labeled-incident data, wherein the labeled-incident data indicates whether the labeled-incident data is related to a migration incident. The embodiment then determines that the extracted incident data is related to the migration incident based on the calculated degree of proximity. The embodiment then extracts, from a plurality of notes, the migration note associated with the extracted incident data, and outputs the migration note.

20 Claims, 6 Drawing Sheets

Note Discovery System 100

(56) References Cited

OTHER PUBLICATIONS

NLTK, Natural Language Toolkit, printed Nov. 9, 2023, from https://www.ntlk.org, 4 pages, Jan. 2, 2023.

sklearn.cluster.KMeans—scikit-learn 1.3.2 documentation, printed Nov. 9, 2023, from https://scikit-learn.org/stable/modules/generated/sklearn.cluster.KMeans.html, 8 pages, Copyright 2007-2023.

* cited by examiner

AUTOMATED DISCOVERY OF MIGRATION NOTES

BACKGROUND

Enterprise resource planning (ERP) systems are being implemented by many companies today as the backbone systems that support business activities. Modern ERP systems can deliver superior performance through fast and effective design and provide real-time insight into business operations. In addition, modern ERP systems can introduce advanced capabilities such as predictive analytics and machine learning to improve decision-making and business outcomes. Therefore, to remain competitive in today's digital environment, companies are considering implementing a modern ERP system.

However, migrating from an existing ERP system to a new ERP system can be fraught with difficulties. System migration may involve a technically complex process that requires specialized skills and expertise, including data migration, code conversion, and system customization. For users who face problems during migration, ERP system vendors may try to solve problems using pre-prepared notes. However, vendors may produce a huge number of notes on a daily basis, most of which are unrelated to system migration. Thus, it may be difficult to find notes that are relevant to system migration among such a large number of notes.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for automatically discovering notes, particularly migration notes among other types of notes.

A note may be data containing solutions for incidents prepared by the system vendor to address system failures or uncertainties faced by the system user. For example, a note may be a document that describes the specific action to be taken. In another example, a note may contain patch data to be applied to the system.

This disclosure describes, as an example, a system for note discovery that extracts and outputs notes related to a specific incident from a large number of notes. In particular, the present disclosure uses incidents related to system migration (e.g., migration incidents) as an example of the specific incident. However, the present disclosure is applicable to systems that extract and output notes related to incidents other than migration incidents.

Figure 1:
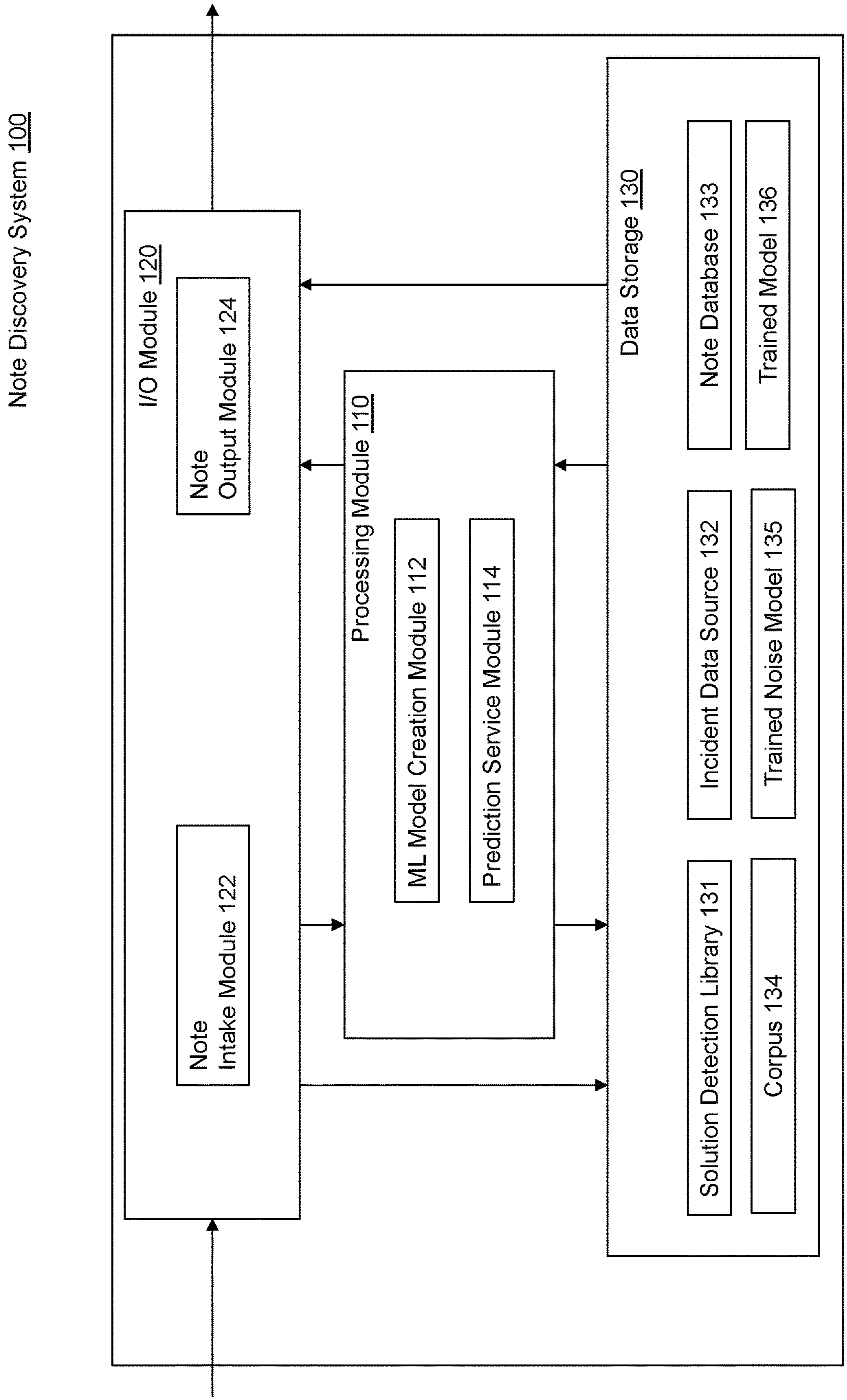
FIG. 1 is a block diagram of a system for note discovery, according to some embodiments.

FIG. 1 is a block diagram of system 100 for note discovery, according to some embodiments. A system vendor may use system 100 to support a system user who faces an incident related to a system migration. System 100 may discover a migration note, which may provide a solution for a migration. System 100 may include processing module 110, input and output (I/O) module 120, and data storage 130.

An overview of each functional block in FIG. 1 is given below, and the operations of each functional block are explained using the flowcharts in FIGS. 2-5.

Processing module 110 may be a processing unit, computing system, cloud server, or other device as would be appreciated by a person of ordinary skill in the art. Processing module 110 may include machine learning (ML) model creation module 112 and prediction service module 114. Processing module 110 may control other elements that make up system 100.

ML model creation module 112 may create a trained model and other related data to be used by prediction service module 114 to discover the migration notes. ML model creation module 112 may perform machine learning based on the notes which are previously created. Prediction service module 114 may use the trained model and data obtained by machine learning to discover migration notes based on newly acquired approved note. Details of the creation of the trained model and data are described below using the flowcharts.

I/O module 120 may be an I/O interface, network interface, I/O device, or other device as would be appreciated by a person of ordinary skill in the art. I/O module 120 may include note intake module 122 and note output module 124. Note intake module 122 may receive the note from outside of system 100 or note database 133. The received notes may be used for discovery of migration notes. Note output module 124 may output the discovered migration note to outside of system 100 or note database 133. Note output module 124 may output the discovered migration note via a migration tool for the migration.

Data storage 130 may be a storage device, data server, or other device as would be appreciated by a person of ordinary skill in the art. Data storage 130 may include solution detection library 131, incident data source 132, note database 133, corpus 134, trained noise model 135, and trained model 136.

Solution detection library 131 may associate and store notes with identification (ID) of incident data to which the notes are to be referred. The incident data may include a description of the incident. Solution detection library 131 may receive the note or information indicating the note. Solution detection library 131, in response to the receipt of the note, may return the ID of incident data in which the received note are referenced. Solution detection library 131 may be an application programming interface (API). Solution detection library 131 may refer to incident data source 132. Solution detection library 131 may refer to 'note_component_mapping' or 'solving notes' fields stored in Solution detection library 131 to find the ID of incident data in which the received note are referenced Incident data source 132 may store the incident data. For example, incident data source 132 may store the incident data using the following fields as an example.

| No | Filed Name | Description |
|---|---|---|
| 1 | 'number_display_value' | Unique identifier for Incident ID |
| 2 | 'css_object_id' | Unique identifier for Incident ID (for use in other systems) |
| 3 | 'component' | Incident Component |
| 4 | 'description' | Incident Title |
| 5 | 'communication_text' | Communication summary text between customer and support team |
| 6 | 'long_description' | Detailed description of incident. |
| 7 | 'confirmed_at_dt' | Incident closed date and time (Empty or Null in case of open incidents) |
| 8 | 'incident_created_at_dt' | Incident raised date and time |
| 9 | 'extracted_at_dt' | Additional Incident date and time |
| 10 | 'version' | Incident product version |
| 11 | 'solns' | Notes/Knowledge base articles attached to solution/knowledge tab of the incident |
| 12 | 'note_component_mapping' | Mentioned Notes in incident that may have been used to resolve the incident (extracted with help from solution detection library 131) |
| 13 | 'solving_notes' | Solution Notes that may have been used to resolve the incident (extracted with help from solution detection library 131) |

For example, the 'title' field may include a text of a title used in a message regarding the incident, such as "Reporting *** incident" or "Please let us know the solution . . . "

Note database 133 may store the note. For example, note database 133 may store the note using the following fields.

| No | Filed Name | Description |
|---|---|---|
| 1 | _id | Note number which is used to uniquely identify the Notes/Knowledge base articles |
| 2 | lastChangedOn | Last change date of note |
| 3 | initialReleasedOn | Initial release date of note |
| 4 | applicationComponent | Application component |
| 5 | correctionInstructions | Correction Instructions included in note |
| 6 | status | Status of note |
| 7 | statusText | Status Text of note |
| 8 | category | category of note |
| 9 | categoryText | category Text of note |
| 10 | priority | Priority of note |
| 11 | priorityText | Priority text of note |

Corpus 134 may store a collection of terms relating to a specific incident. The specific incident may be a migration incident. Corpus 134 may be used as one of tools to determine whether the incident data is related to a migration incident. A method of identifying the migration incident using corpus 134 is described below by using the flowchart described in FIG. 3.

Trained noise model 135 may be a learned model to remove noise from a description of the incident of the incident data. The noise may be text, which is not related to the specific incident (e.g., migration incident.) The description of the incident may include the incident title and detailed description of the incident described in the 'description', and 'long_description' fields of the incident data. By removing the noise, the description of the incident can be easily used in the analysis to discover the migration note. A method of generating and using trained noise model 135 is described below using the flowcharts described in FIGS. 3 and 4.

Trained model 136 may be a learned model to determine whether the incident data is related to the migration incident. A method of generating and using trained model 136 is described below using the flowcharts described in FIGS. 2-5.

Preparation of Learned Models

Figure 2:
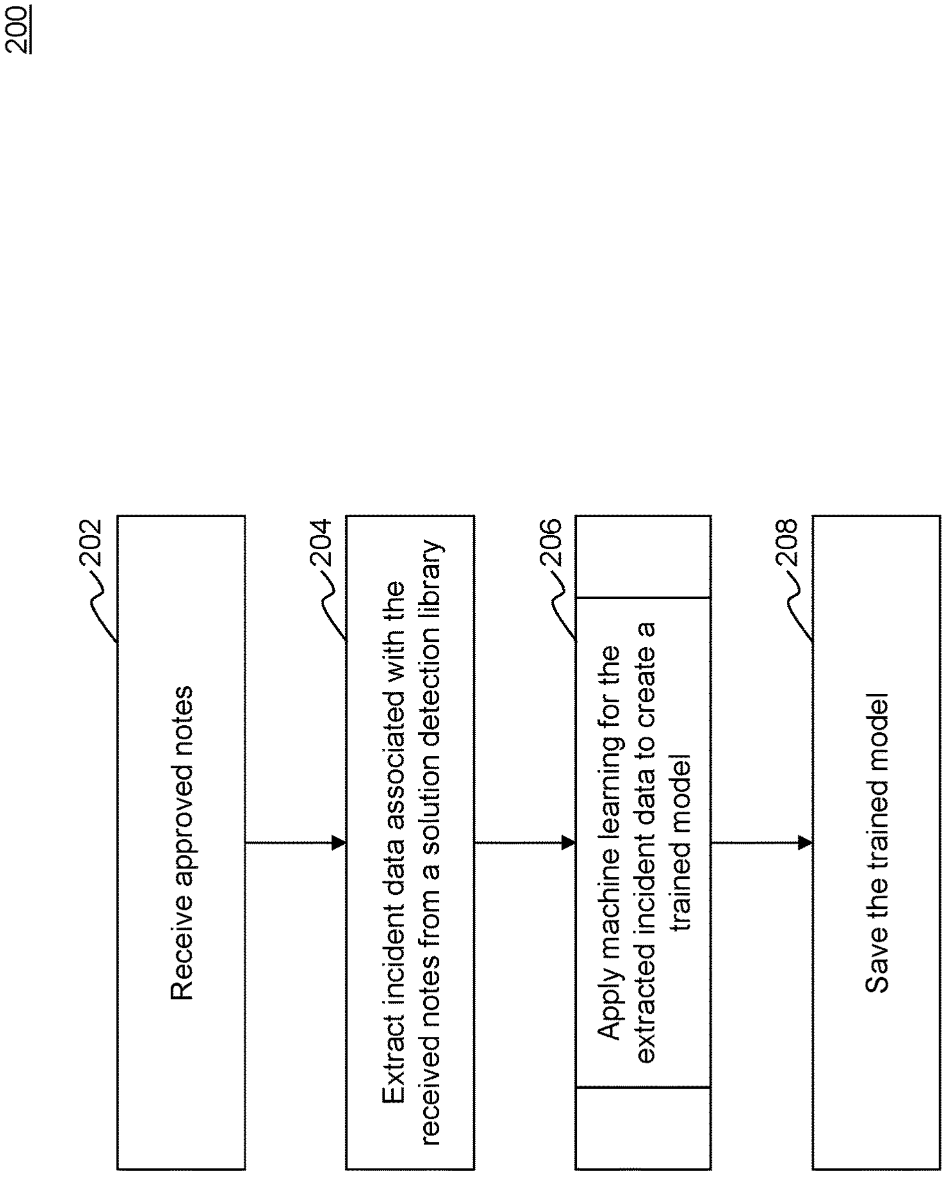
FIG. 2 is a flowchart for a method for preparing a trained model for note discovery, according to some embodiments.
Figure 3:
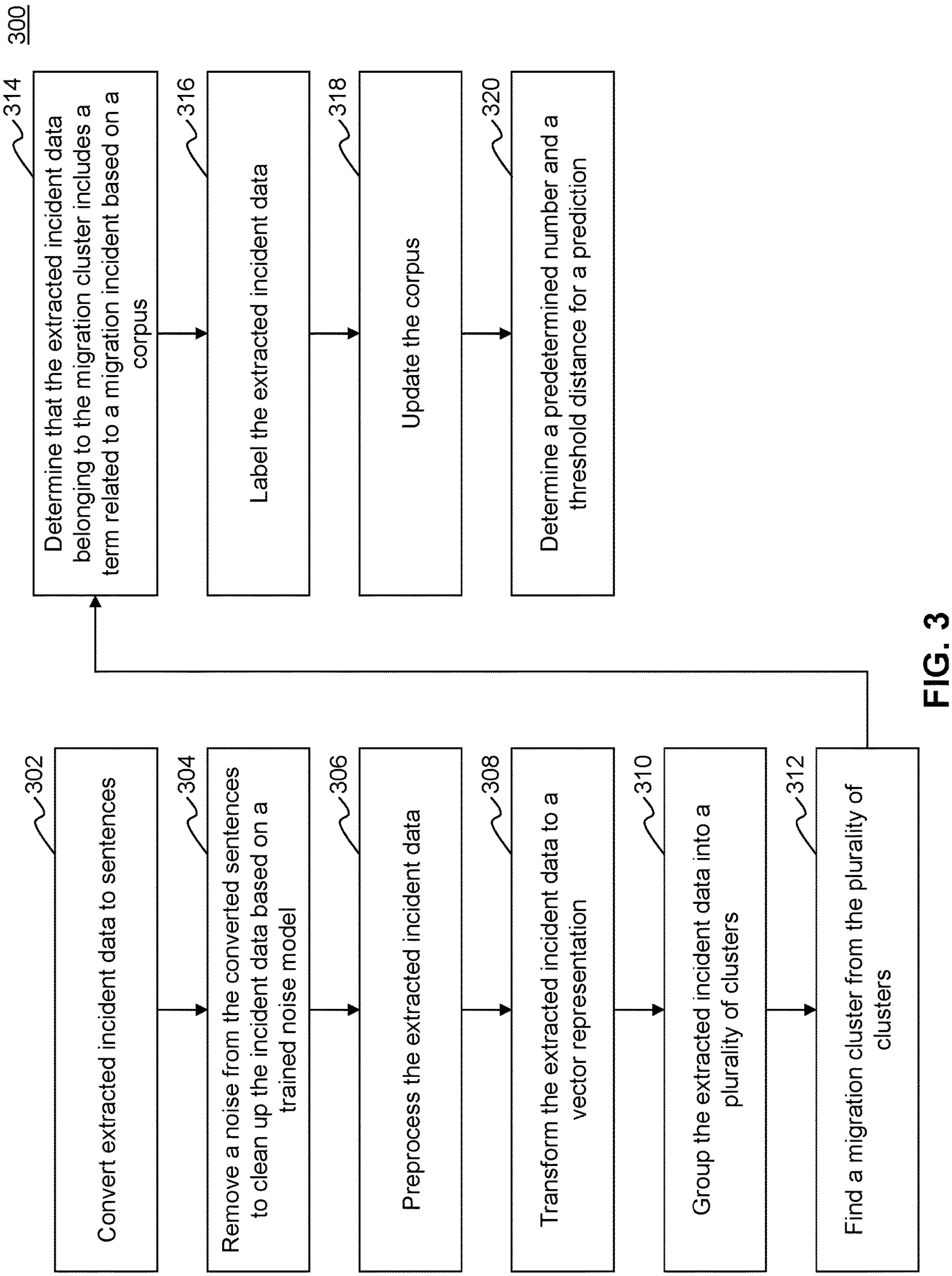
FIG. 3 is a flowchart for applying machine learning for the extracted incident data to create the trained model, according to some embodiments.
Figure 4:
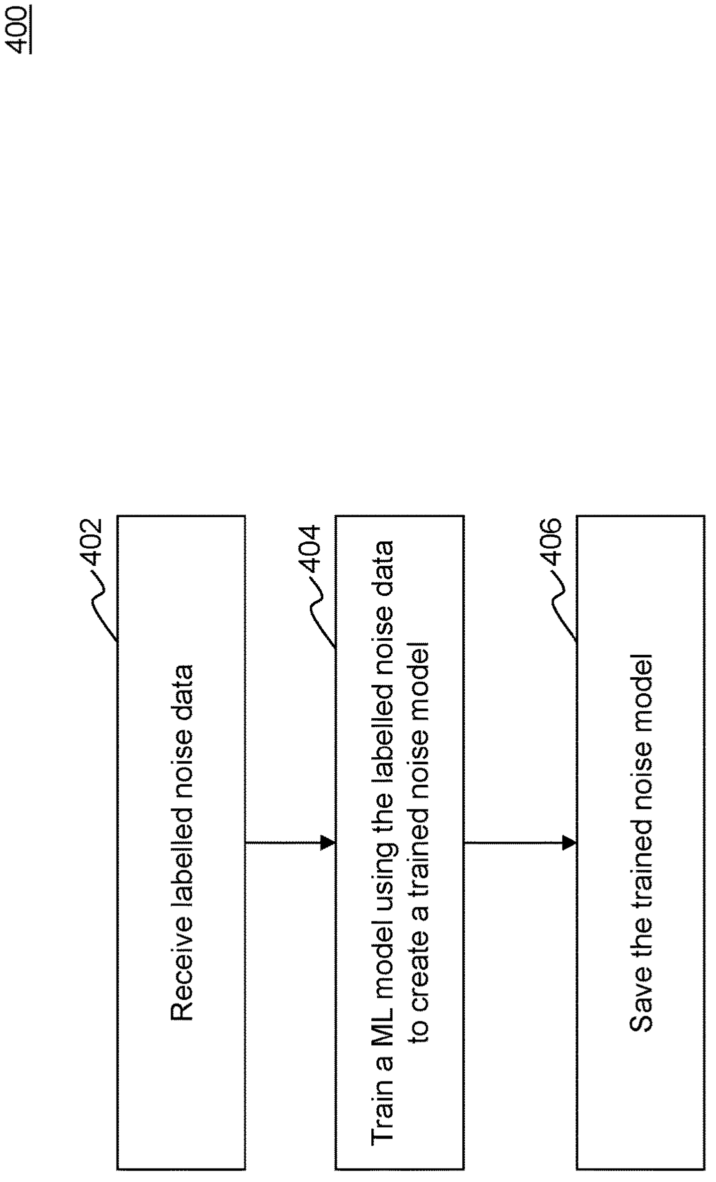
FIG. 4 is a flowchart for preparing a trained noise model, according to some embodiments.

The flowchart described in FIGS. 2-4 illustrates how trained noise model 135 and trained model 136 are generated. Each of the operations shown in the flowcharts may be performed primarily by ML model creation module 112 of system 100.

FIG. 2 is a flowchart for a method 200 for preparing a trained model for note discovery, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

Method 200 shall be described with reference to FIG. 1. However, method 200 is not limited to that example embodiment.

In 202, system 100 may receive approved notes. For example, note intake module 112 may receive the approved notes. The approved notes can be the notes, which are pre-approved by experts as relevant to the migration. The approved notes may be stored in note database 133 with the value of the 'status' field indicating "approved." A note received in 202 may not necessarily have to be pre-approved, and is hereafter referred to simply as "received note."

In 204, system 100 may extract incident data associated with the received notes. This operation may be performed by referencing solution detection library 131 and incident data source 132. For example, ML model creation module 112 may refer to solution detection library 131 using the received note or information associated with the received note. As explained above, in response to the receipt of the note, solution detection library 131 may return the ID of incident data in which the received note is referenced. Then, ML model creation module 112 may refer to incident data source 132 using the received ID of incident data. As explained above, incident data source 132 may store the incident data associated with IDs of incident data. As such, system 100 may extract incident data associated with the received notes. There may be more than one incident data to which the received note refers.

In 206, system 100 may apply machine learning for the extracted incident data to create a trained model. Details of this operation are described below using the flowchart in FIG. 3.

In 208, system 100 may save trained model 136 created in 206. For example, ML model creation module 112 may save trained model 136 in data storage 130.

FIG. 3 is a flowchart for a method 300 for applying machine learning for the extracted incident data to create the trained model, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIG. 1. However, method 300 is not limited to that example embodiment.

In 302, system 100 may convert extracted incident data to sentences. For example, ML model creation module 112 may convert the description of the incident of the extracted incident data to sentences. The description of the incident may include the incident title and detailed description of the incident. In 302, ML model creation module 112 may concatenate the incident title and detailed description of the incident and then split the concatenated data into individual sentences using spacy sentence tokenizer for each incident data. For example, the description of the incident of the extracted incident data may be:

"Hello Good morning team, we are having issue. In migration, they do not see any errors and it works. It is also possible to reset the cancelled packages and start then resume migration.
. . . "

Then the description of the incident may be converted to sentences as:

"Hello Good morning team, we are having issue."
"In migration, they do not see any errors and it works."
"It is also possible to reset the cancelled packages and start then resume migration."
" . . . "

As such, the description of the incident of the extracted incident data may be converted to the sentences. The sentences obtained in this step can be used as the basic unit for subsequent processing. For simplicity of explanation, sentences may be referred to as extracted incident data as well.

In step 304, system 100 may remove a noise from the converted sentences to clean up the incident data based on trained noise model 135. As explained above, by removing the noise, the description of the incident can be easily used in the analysis to discover the migration note. A method of generating and using trained noise model 135 is described using the flowchart in FIG. 4.

In 306, system 100 may preprocess the extracted incident data. For example, ML model creation module 112 may clean the extracted data using pre-processing techniques like lemmatization and/or inflection.

In 308, system 100 may transform the extracted incident data to a vector representation. For example, ML model creation module 112 may apply Gensim's Sent2Vec to the extracted incident data to transform the extracted incident data to a vector representation. As such, a vector representation of each sentence of incident data can be obtained. The vector representation of each sentence of incident data can be used for machine learning described below.

In 310, system 100 may group the extracted incident data into a plurality of clusters. For example, ML model creation module 112 may process the extracted incident data with unsupervised K-means clustering. As a result of the grouping, each cluster may contain a plurality of data records of the extracted incident. ML model creation module 112 may further validate the clustering by performing following steps/methods: 1) Average sum of squared distances, 2) Elbow method, 3) Silhouette Score, and/or 4) Inter cluster Centroid Distance.

In 312, system 100 may find a migration cluster from the plurality of clusters. For example, ML model creation module 112 may find a migration cluster, a cluster where the sentences of extracted data belonging to that cluster are related to migration. To find the migration cluster, ML model creation module 112 may perform following steps/methods: 1) Doc frequency, 2) Topic Modelling, and/or 3) Bigram Analysis. These steps/methods may be examples for finding specific clusters. ML model creation module 112 may find the specific clusters in other steps/methods as would be appreciated by a person of ordinary skill in the art. In this way, the system 100 can identify migration clusters including a set of extracted incident data in vector space.

In 314, system 100 may determine that the extracted incident data belonging to the migration cluster includes a term related to a migration incident based on corpus 134. Although extracted incident data belonging to the migration cluster is likely to be migration incident data, it may contain incident data that is not related to migration. Therefore, system 100 may perform rule-based secondary classification using corpus 134. For example, ML model creation module 112 may determine whether the extracted incident data contains a term stored in corpus 134. As explained, corpus 134 may store a collection of terms relating to the migration incident. Thus, ML model creation module 112 may determine that incident data with sentences containing terms in the corpus are the migration incident data.

In 316, system 100 may label the extracted incident data, determined as including a term related to a migration incident, as the migration incident data. System 100 may also label the extracted incident data, determined as not including a term related to a migration incident, as the non-migration incident data The incident data labeled in 316 may referred to as labeled-incident data.

In 318, system 100 may update corpus 134. The migration incident data labeled at 316 is likely to contain terms related to migration other than those previously stored in corpus 134. Therefore, ML model creation module 112 may update corpus 134 based on the terms contained in the migration incident data labeled in 316 for improving the accuracy of corpus 134 and the accuracy of finding migration notes.

In 320, system 100 may determine a predetermined number of neighbors and a threshold distance for a prediction. As described in detail below, prediction service module 114 can, in performing the prediction service, map the incident data extracted based on newly received notes to the vector space created by the operations described above. Prediction service module 114 may calculate a degree of proximity between the extracted incident data and a labeled-incident data to determine whether determining that the extracted incident data is related to the migration incident. The calculation of the degree of proximity may be based on 1) whether the predetermined number of neighbor labeled-incident data are migration incident data and/or 2) whether distances between the extracted incident data and the predetermined number of neighbor labeled-incident data are less than the threshold distance. To enable the calculation of the degree of proximity, in 320, ML model creation module 112 determines the predetermined number and threshold. ML model creation module 112 may adopt the average distance between migration incident data and labeled data at 316 as a threshold distance. ML model creation module 112 may determine the predetermined number based on the change in accuracy when the number of neighboring labeled-incident data referenced is varied. For example, below is a table showing the change in accuracy when the number of neighbors is varied. In the table, precision and recall are calculated based on: TP: a number of sentences related to a migration (migration sentences) classified as migration incident data, FP: number of Non-migration sentences not related to a migration (non-migration sentences) classified as migration incident data, TN: a number of non-migration sentences classified as non-migration incident data, and FN: a number of migration sentences classified as non-migration incident data.

| No. of neighbors | Precision | Recall | TP | FP | TN | FN |
|---|---|---|---|---|---|---|
| 3 | 85.9 | 87.5 | 420 | 69 | 451 | 60 |
| 5 | 92.6 | 83.8 | 402 | 32 | 488 | 78 |
| 7 | 93.3 | 66.7 | 320 | 23 | 497 | 160 |
| 10 | 94.9 | 50.6 | 243 | 13 | 507 | 237 |
| 12 | 96 | 39.6 | 190 | 8 | 512 | 290 |
| 15 | 97.9 | 33.1 | 159 | 5 | 515 | 321 |
| 18 | 97.7 | 26.5 | 127 | 3 | 517 | 353 |
| 20 | 98.3 | 24.4 | 117 | 2 | 518 | 363 |
| 23 | 99 | 20 | 96 | 1 | 519 | 384 |
| 25 | 98.7 | 16.3 | 78 | 1 | 519 | 402 |

From the sum oF the precision an recall values shown above, the ML model creation module 112 may select 5 as a predetermined number of neighbors.

As already mentioned, in 208 of FIG. 2, the results of the clustering (labeled-incident data on vector space) and predetermined number and threshold distance determined by the operations described above may be stored by ML model creation module 112 in data storage 130 as trained model 136.

FIG. 4 is a flowchart for a method 400 for preparing a trained noise model, according to some embodiments. The operations of method 400 may be performed before the operations of method 300. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIG. 1. However, method 400 is not limited to that example embodiment.

In 402, system 100 may receive labelled noise data. The labelled noise data may be a text, which is labelled as not related to the specific incident (e.g., migration incident.) The noise may be generic across all the components of the incident data stored in incident data source 132. To address this technological issue, noise of the incident data may be labeled as the labeled noise data and collected in system 100. The labelled noise data may include: "communication_text," "Thanks, *," "Dear * Thank you for contacting our global support," "I am the processor for your message and will support you in resolving the issue," "Best Regards, **," "Regards, *," "Regards *," "Thank you," "Cannot go forward to update our portal to 7.4," "Dear Customer Thank you for contacting our support," "You will find a lot of information in the documentation I attached in the note," and "Thank you, *" where "*" represents a wildcard.

In 404, system 100 may train a ML model using the labelled noise data to create a trained noise model 135. For example, ML model creation module 112 may train, based on the labeled noise data, a Gensim Doc2Vec model, which can recognize the noise data and ensure to capture the noise of incident data based on similarity. The Gensim Doc2Vec model may be one of the methods for training the ML model using the labelled noise data to create a trained noise model 135. ML model creation module 112 may train the ML model in other methods as would be appreciated by a person of ordinary skill in the art.

In 406, system 100 may save trained noise model 135. For example, ML model creation module 112 may save a Doc2Vec pickle file trained on the labeled noise data in the data storage 130 as trained noise model 135. Trained noise model 135 obtained in this way can be applied to incident data to detect and remove noise. For example, by applying trained noise model 135 to the extracted incident data explained in 302, the noises can be removed and the extracted incident data can be:

"In migration, they do not see any errors and it works."

"It is also possible to reset the cancelled packages and start then resume migration."

Prediction Service

Figure 5:
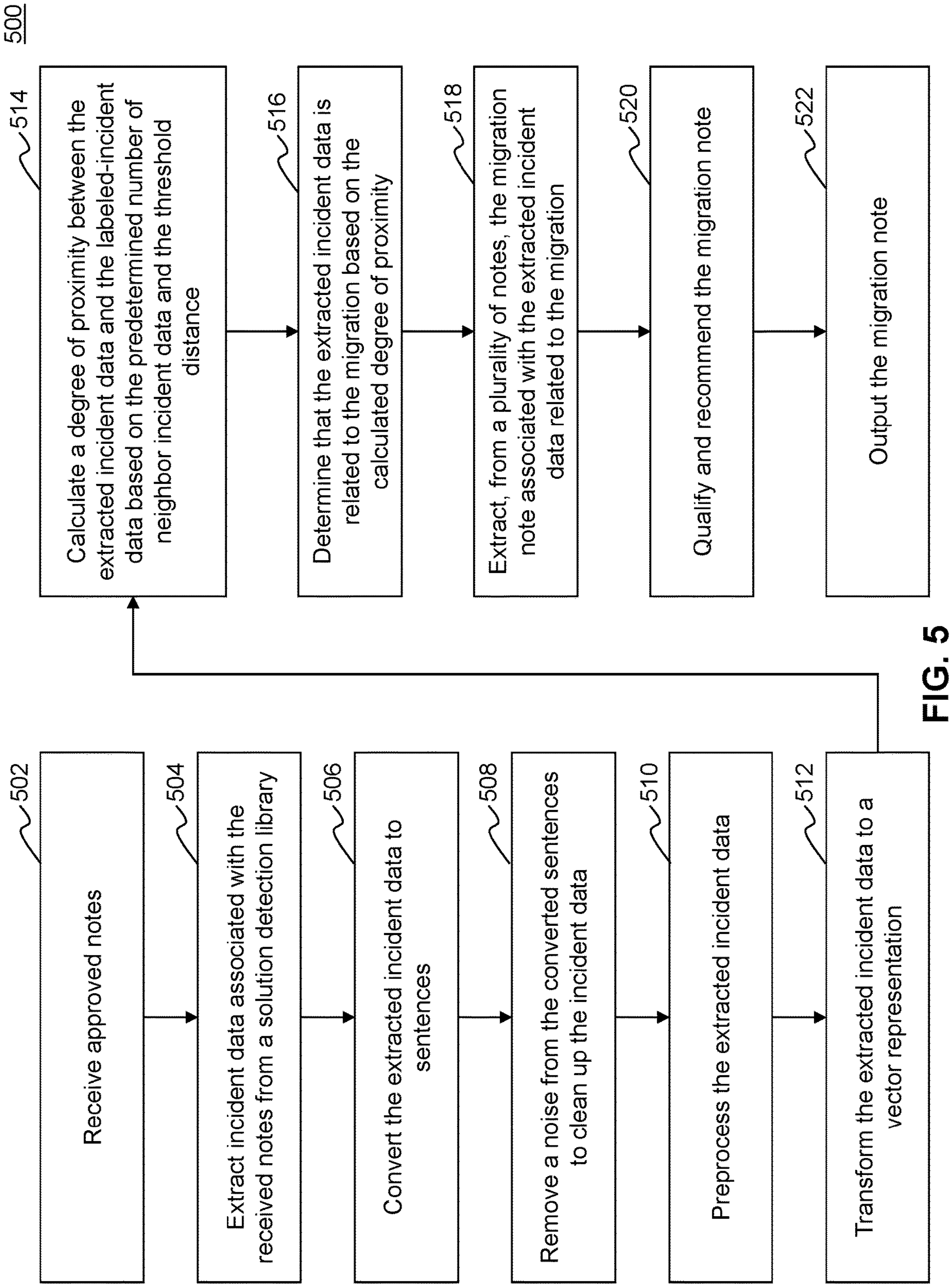
FIG. 5 is a flowchart for outputting a migration note as a result of a prediction service, according to some embodiments.

FIG. 5 is a flowchart for outputting a migration note as a result of a prediction service, according to some embodiments. Each of the operations shown in the flowchart may be performed primarily by prediction service module 114 of system 100. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIG. 1. However, method 500 is not limited to that example embodiment.

In 502, system 100 may receive approved notes. This operation is almost similar to the one described in 202 of FIG. 2, but the approved notes in operation 502 may be received after preparing the learned model described in FIGS. 2-4. Prediction service module 114 can perform the following operations to find and output the migration notes associated with the received notes, so that problems that cannot be addressed by the approved notes alone can be addressed.

In 504, system 100 may extract incident data associated with the received notes. This operation is almost similar to the one described in 204 of FIG. 2. As a result, prediction service module 114 can extract incident data associated with the received notes.

In 506, system 100 may convert the extracted incident data to sentences. This operation is almost similar to the one described in 302 of FIG. 3 and a detailed description is omitted to avoid complicating the explanation.

In 508, system 100 may Removing a noise from the converted sentences to clean up the incident data. This operation is almost similar to the one described in 304 of FIG. 3.

In 510, system 100 may preprocess the extracted incident data. This operation is almost similar to the one described in 306 of FIG. 3 and a detailed description is omitted to avoid complicating the explanation.

In 512, system 100 may transform the extracted incident data to a vector representation. This operation is almost similar to the one described in 308 of FIG. 3 and a detailed description is omitted to avoid complicating the explanation.

In 514, system 100 may calculate a degree of proximity between the extracted incident data and the labeled-incident data based on the predetermined number of neighbor incident data and the threshold distance. As explained in FIGS. 2-3, the results of the clustering (labeled-incident data on vector space) and predetermined number and threshold distance may be stored in data storage 130 as trained model 136. Prediction service module 114 may map the vector representation of the extracted incident data to the vector space. Then, prediction service module 114 may be identifying a predetermined number (e.g., 5) of the labeled-incident data in proximate to the extracted incident data, as identified labeled-incident data. Further, prediction service module 114 may determine: 1) whether the identified labeled-incident data is labeled as migration incident data and/or 2) whether the distances between the extracted incident data and the identified labeled-incident data are less than a predetermined threshold. The results of the determinations are saved as the degree of proximity between the extracted incident data and the labeled-incident data.

In 516, system 100 may determine that the extracted incident data is related to the migration (migration incident data) based on the calculated degree of proximity. For example, prediction service module 114 may determine that the extracted incident data is the migration incident data when: 1) all the identified labeled-incident data is labeled as migration incident data, and 2) all distances between the extracted incident data and the identified labeled-incident data are less than a predetermined threshold. Since the determination is performed on a sentence-by-sentence basis in the extracted incident data and the labeled-incident data, prediction service module 114 may determine that the extracted incident data is the migration incident data when at least one of the sentences of the extracted incident data satisfies the above conditions. The above conditions are examples, and the conditions may be varied as appropriate depending on the accuracy desired by the system operator. Prediction service module 114 may add the extracted incident data that is determined as migration incident data in 516 may to trained model 136 as new labeled incident data. Prediction service module 114 may also update corpus 134 as described in 318 of FIG. 3 based on the extracted incident data determined as the migration incident data in 516.

In 518, system 100 may extract, from a plurality of notes, the migration note associated with the migration incident data determined in 516. For example, prediction service module 114 may use solution detection library 131 to extract the migration note associated with the migration incident data from note database 133. As explained, solution detection library 131 may associate and store notes with identification (ID) of incident data to which the notes are to be referred. Thus, prediction service module 114 can use solution detection library 131 to identify the notes associated with migration incident data determined in 516. As such, prediction service module 114 can extract the identified note from note database 133 as migration note. Migration notes extracted in this way can be rephrased as notes that should be referred to in order to resolve migration incidents related to the approved notes. Therefore, it is likely that the extracted migration notes can be used as a clue to resolve the migration incident that caused the reference to the approved note. In this way, useful notes can be efficiently discovered from a huge number of notes.

In 520, system 100 may qualify and recommend the migration note extracted in 518. The qualification and recommendation may be performed in various ways. For example, prediction service module 114 may qualify and recommend the migration note based on a predetermined rule such as, using scores, relevancy, and reviews.

In 522, system 100 may output the migration note. For example, prediction service module 114 may output the migration note via note output module 124. As explained, note output module 124 may output the migration note to outside of system 100 or note database 133. Note output module 124 may output the discovered migration note via the migration tool for the migration.

Figure 6:
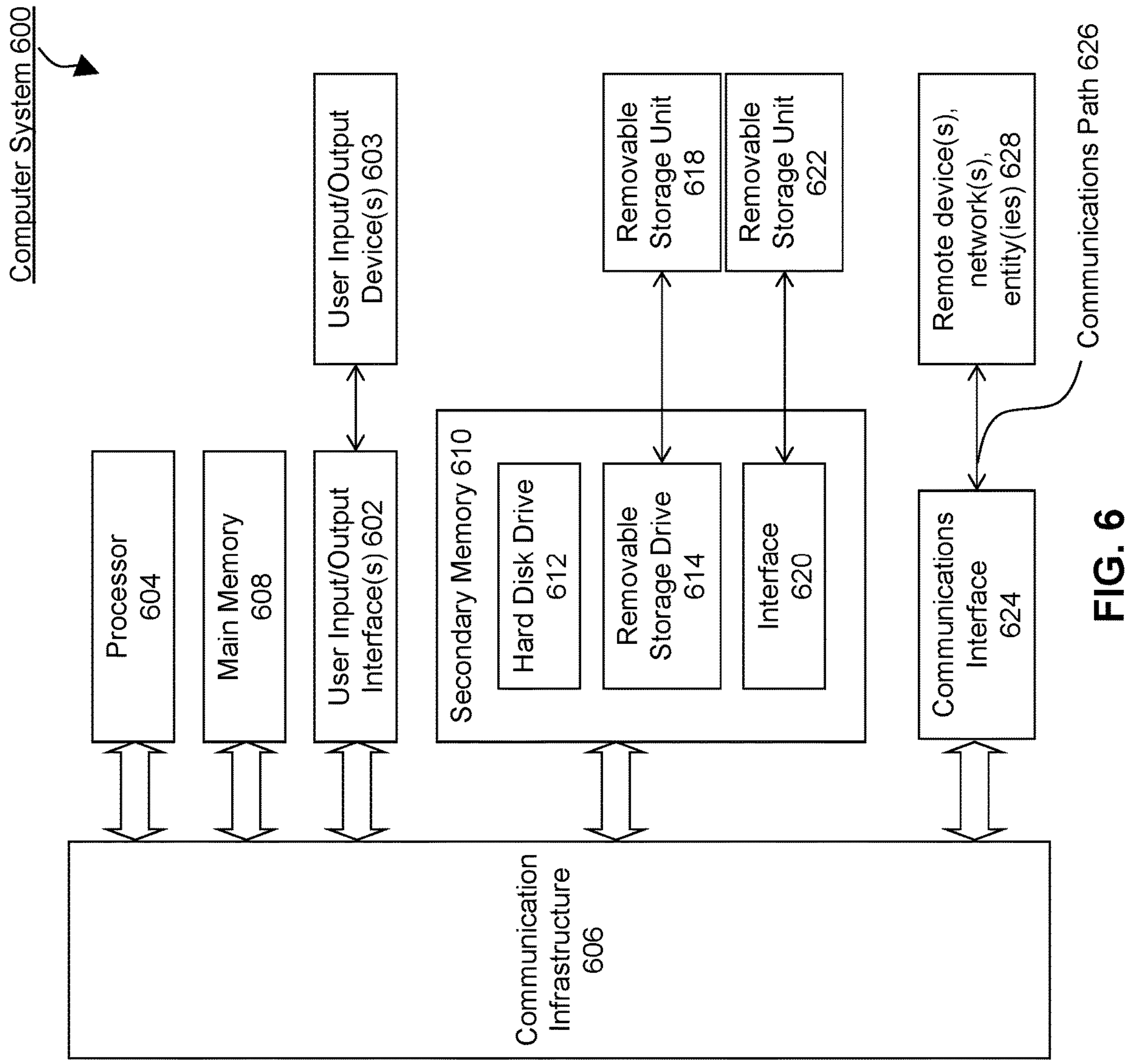
FIG. 6 is an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). A GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for performing a system migration in a computing system, the computer-implemented method comprising:

receiving, by at least one processor, a note from the computing system, wherein the received note fails to provide a solution for a migration incident, and wherein the migration incident occurs during the system migration;

extracting incident data associated with the received note, wherein the incident data comprises a data object of the migration incident;

converting the data object of the migration incident into a description of the migration incident, wherein the converting further comprises:

concatenating a title field of the data object and a detailed description field of the data object into a concatenated description;

recognizing, using a trained noise model, at least one word within the concatenated description as noise based on a similarity between the at least one word and labeled noise data, wherein the trained noise model is configured to remove noise from the incident data using the labeled noise data, and wherein the labeled noise data comprises text unrelated to the migration incident from prior received notes;

removing the at least one word from the concatenated description, thereby creating a filtered description of the incident data;

tokenizing the filtered description into a set of tokens; and storing the set of tokens in the description of the migration incident;

generating a trained machine learning model to determine whether the incident data is related to the migration incident, the trained machine learning model generated by calculating, based on the description of the migration incident, a degree of proximity between the incident data and labeled-incident data based on an average distance between the labeled-incident data and a number of neighbor-labeled data identified as migration data, wherein the labeled-incident data indicates whether the incident data is related to the migration incident of the computing system undergoing the migration, wherein the degree of proximity is calculated by:

transforming the labeled-incident data into a vectorized representation corresponding to the labeled-incident data;

clustering, using a clustering algorithm, the neighbor-labeled data based on an accuracy metric, wherein the accuracy metric identifies a precision in which the neighbor-labeled data is related to the migration;

determining, using the accuracy metric, the average distance between the labeled-incident data and the neighbor-labeled data by comparing the vectorized representation of the labeled-incident data with a vectorized representation of the neighbor-labeled data, wherein the comparing outputs a score corresponding to the average distance; and determining whether the score corresponding to the average distance is less than a threshold distance, thereby calculating the degree of proximity;

determining, using the generated trained machine learning model, that the incident data is related to the migration incident based on the calculated degree of proximity;

based on the determining that the incident data is related to the migration incident, extracting, from a plurality of notes previously received from the computing system and using a mapping identifier of the data object, a migration note associated with the migration incident, wherein the migration note comprises one or more actions to be taken towards a system failure experienced by the computing system;

determining, by applying relevancy criteria to the migration note, that the one or more actions of the migration note provides the solution for the migration incident of the computing system; and continuing the system migration of the computer system by resolving the migration incident for the migration, wherein the resolving comprises causing execution of the one or more actions to address the system failure of the computing system.

2. The computer-implemented method of claim 1, wherein the calculating the degree of proximity further comprises:

identifying a predetermined number of the labeled-incident data proximate to the incident data based on the vector representation and based on the clustering algorithm, and wherein the determining that the incident data is related to the migration incident comprises detecting that the labeled-incident data is labeled as relating to the migration incident.

3. The computer-implemented method of claim 2, wherein the determining that the incident data is related to the migration incident comprises:

determining that the incident data is related to the migration incident after detecting that the labeled-incident data is labeled as relating to the migration incident.

4. The computer-implemented method of claim 1, further comprising:

creating the labeled-incident data, wherein creating the labeled-incident data comprises:

grouping a plurality of data records of the incident data into a plurality of clusters;

finding, from the plurality of clusters, a cluster relating to the migration incident; and labeling the incident data, belonging to the cluster found as relating to the migration incident, as relating to the migration incident.

5. The computer-implemented method of claim 4, wherein the labeling the incident data comprises:

determining that the description of the migration incident of the incident data, belonging to the cluster found as relating to the migration incident, comprises a term related to the migration incident; and labeling the incident data as relating to the migration incident.

6. The computer-implemented method of claim 5, wherein the term related to the migration incident is stored in a corpus, and the computer-implemented further comprises:

updating the corpus based on the description of the migration incident of the incident data.

7. A system for performing a system migration in a computing system, comprising:

a memory; and at least one processor coupled to the memory and configured to:

receive a note from the computing system, wherein the received note fails to provide a solution a migration incident, and wherein the migration incident occurs during the system migration;

extract incident data associated with the received note, wherein the incident data comprises a data object of the migration incident;

convert the data object of the migration incident into a description of the migration incident, wherein to convert the data object, the at least one processor is configured to:

concatenate a title field of the data object and a detailed description field of the data object into a concatenated description;

recognize, using a trained noise model, at least one word within the concatenated description as noise based on a similarity between the at least one word and labeled noise data, wherein the trained noise model is configured to remove noise from the incident data using the labeled noise data, and wherein the labeled noise data comprises text unrelated to the migration incident from prior received notes;

remove the at least one word from the concatenated description, thereby creating a filtered description of the incident data;

tokenize the filtered description into a set of tokens; and store the set of tokens in the description of the incident;

generate a trained machine learning model to determine whether the incident data is related to the migration incident, the trained machine learning model generated by calculating, based on the description of the migration incident, a degree of proximity between the incident data and labeled-incident data based on an average distance between the labeled-incident data and a number of neighbor-labeled data identified as migration data, wherein the labeled-incident data indicates whether the incident data is related to the migration incident of the computing system undergoing the migration, wherein the degree of proximity is calculated by:

transforming labeled-incident data into a vectorized representation corresponding to the labeled-incident data;

clustering, using a clustering algorithm, the neighbor-labeled data based on an accuracy metric, wherein the accuracy metric identifies a precision in which the neighbor-labeled data is related to the migration;

determining, using the accuracy metric, the average distance between the labeled-incident data and the neighbor-labeled data by comparing the vectorized representation of the labeled-incident data with a vectorized representation of the neighbor-labeled data, wherein the comparing outputs a score corresponding to the average distance; and determining whether the score corresponding to the average distance is less than a threshold distance, thereby calculating the degree of proximity;

determine, using the generated trained machine learning model, that the incident data is related to the migration incident based on the calculated degree of proximity;

based on the determination that the incident data is related to the migration incident, extract, from a plurality of notes previously received from the computing system and using a mapping identifier of the data object, a migration note associated with the migration incident, wherein the migration note comprises one or more actions to be taken towards a system failure experienced by the computing system;

determine, by applying relevancy criteria to the migration note, that the one or more actions of the migration note provides the solution for the migration incident of the computing system; and continue the system migration of the computer system by resolving the migration incident for the migration, wherein the resolving comprises causing execution of the one or more actions to address the system failure of the computing system.

8. The system of claim 7, wherein the at least one processor is further configured to:

identify a predetermined number of the labeled-incident data proximate to the incident data based on the vector representation and based on the clustering algorithm, and wherein to determine that the incident data is related to the migration incident, the at least one processor is configured to detect that the labeled-incident data is labeled as relating to the migration incident.

9. The system of claim 8, wherein to determine the incident data is related to the migration incident, the at least one processor is configured to:

determine that the incident data is related to the migration incident after detecting that the labeled-incident data is labeled as relating to the migration incident.

10. The system of claim 8, wherein the at least one processor is further configured to:

create the labeled-incident data, wherein to create the labeled-incident data, the at least one processor is configured to:

group a plurality of data records of the incident data into a plurality of clusters;

find, from the plurality of clusters, a cluster relating to the migration incident; and label the incident data, belonging to the cluster found as relating to the migration incident, as relating to the migration incident.

11. The system of claim 10, wherein to label the incident data, the at least one processor is configured to:

determine that the description of the migration incident of the incident data, belonging to the cluster found as relating to the migration incident, comprises a term related to the migration incident; and label the incident data as relating to the migration incident.

12. The system of claim 11, wherein the term related to the migration incident is stored in a corpus, and the at least one processor is further configured to:

update the corpus based on the description of the migration incident of the incident data.

13. A non-transitory computer-readable medium for performing a system migration in a computing system, having instructions stored thereon that, when executed by at least one computing device, cause the at least one computing device to perform operations comprising:

receiving, by at least one processor, a note from the computing system, wherein the received note fails to provide a solution for a migration incident, and wherein the migration incident occurs during the system migration;

extracting incident data associated with the received note, wherein the incident data comprises a data object of the migration incident;

converting the data object of the migration incident into a description of the migration incident, wherein the converting further comprises:

concatenating a title field of the data object and a detailed description field of the data object into a concatenated description;

recognizing, using a trained noise model, at least one word within the concatenated description as noise based on a similarity between the at least one word and labeled noise data, wherein the trained noise model is configured to remove noise from the incident data using the labeled noise data, and wherein the labeled noise data comprises text unrelated to the migration incident from prior received notes;

removing the at least one word from the concatenated description, thereby creating a filtered description of the incident data;

tokenizing the filtered description into a set of tokens; and storing the set of tokens in the description of the migration incident;

generating a trained machine learning model to determine whether the incident data is related to the migration incident, the trained machine learning model generated by calculating, based on the description of the migration incident, a degree of proximity between the incident data and labeled-incident data based on an average distance between the labeled-incident data and a number of neighbor-labeled data identified as migration data, wherein the labeled-incident data indicates whether the incident data is related to the migration incident of the computing system undergoing the migration, wherein the degree of proximity is calculated by:

transforming labeled-incident data into a vectorized representation corresponding to the labeled-incident data;

clustering, using a clustering algorithm, the neighbor-labeled data based on an accuracy metric, wherein the accuracy metric identifies a precision in which the neighbor-labeled data is related to the migration;

determining, using the accuracy metric, the average distance between the labeled-incident data and the neighbor-labeled data by comparing the vectorized representation of the labeled-incident data with a vectorized representation of the neighbor-labeled data, wherein the comparing outputs a score corresponding to the average distance; and determining whether the score corresponding to the average distance is less than a threshold distance, thereby calculating the degree of proximity;

determining, using the trained machine learning model, that the incident data is related to the migration incident based on the calculated degree of proximity;

based on the determining that the incident data is related to the migration incident, extracting, from a plurality of notes previously received from the computing system and using a mapping identifier of the data object, a migration note associated with the migration incident, wherein the migration note comprises one or more actions to be taken towards a system failure experienced by the computing system;

determining, by applying relevancy criteria to the migration note, that the one or more actions of the migration note provides the solution for the migration incident of the computing system; and continuing the system migration of the computer system by resolving the migration incident for the migration, wherein the resolving comprises causing execution of the one or more actions to address the system failure of the computing system.

14. The non-transitory computer-readable medium of claim 13, wherein the calculating the degree of proximity comprises:

identifying a predetermined number of the labeled-incident data proximate to the incident data based on the vector representation and based on the clustering algorithm, and wherein the determining that the incident data is related to the migration incident comprises detecting that the labeled-incident data is labeled as relating to the migration incident.

15. The non-transitory computer-readable medium of claim 14, wherein the determining the incident data is related to the migration incident comprises:

determining that the incident data is related to the migration incident after detecting that the labeled-incident data is labeled as relating to the migration incident.

16. The non-transitory computer-readable medium of claim 15, the operations further comprising:

creating the labeled-incident data, wherein the creating the labeled-incident data comprises:

grouping a plurality of data records of the incident data into a plurality of clusters;

finding, from the plurality of clusters, a cluster relating to the migration incident; and labeling the incident data, belonging to the cluster found as relating to the migration incident, as relating to the migration incident.

17. The non-transitory computer-readable medium of claim 16, the labeling the incident data comprising:

determining that the description of the migration incident of the incident data, belonging to the cluster found as relating to the migration incident, comprises a term related to the migration incident; and labeling the incident data as relating to the migration incident.

18. The computer-implemented method of claim 1, wherein the resolving the migration incident further comprises:

detecting that the one or more actions of the migration note include patch data to be applied to the computing system; and applying the patch data to the computing system to address the system failure of the computing system.

19. The system of claim 7, wherein to resolve the migration incident, the at least one processor is further configured to:

detect that the one or more actions of the migration note include patch data to be applied to the computing system; and apply the patch data to the computing system to address the system failure of the computing system.

20. The non-transitory computer-readable medium of claim 13, wherein the resolving the migration incident further comprises:

detecting that the one or more actions of the migration note include patch data to be applied to the computing system; and applying the patch data to the computing system to address the system failure of the computing system.

* * * * *